(12) United States Patent
Fare'

(10) Patent No.: US 11,761,129 B2
(45) Date of Patent: Sep. 19, 2023

(54) PROCESS AND AN APPARATUS FOR THE PRODUCTION OF A VOLUMINOUS NONWOVEN FABRIC

(71) Applicant: FARE' S.p.A., Fagnano Olona Va (IT)

(72) Inventor: Rosaldo Fare', Fagnano Olona Va (IT)

(73) Assignee: FARE' S.p.A., Fagnano Olona Va (IT)

( * ) Notice: Subject to any disclaimer, the term of this patent is extended or adjusted under 35 U.S.C. 154(b) by 542 days.

(21) Appl. No.: 16/595,990

(22) Filed: Oct. 8, 2019

(65) Prior Publication Data

US 2021/0102319 A1    Apr. 8, 2021

(51) Int. Cl.
| | |
|---|---|
| *D04H 1/488* | (2012.01) |
| *D04H 1/54* | (2012.01) |
| *D04H 1/06* | (2012.01) |
| *B32B 5/02* | (2006.01) |

(52) U.S. Cl.
CPC ............... *D04H 1/488* (2013.01); *D04H 1/06* (2013.01); *D04H 1/54* (2013.01); *B32B 5/022* (2013.01)

(58) Field of Classification Search
CPC combination set(s) only.
See application file for complete search history.

(56) References Cited

U.S. PATENT DOCUMENTS

| | | | |
|---|---|---|---|
| 6,641,916 B1* | 11/2003 | Chang | D01F 8/14 |
| | | | 428/374 |
| 6,984,272 B2* | 1/2006 | Takahashi | C22F 1/183 |
| | | | 148/558 |
| 2015/0017411 A1* | 1/2015 | Wilkie | D04H 3/08 |
| | | | 442/364 |

* cited by examiner

*Primary Examiner* — Lynda Salvatore
(74) *Attorney, Agent, or Firm* — Sughrue Mion, PLLC

(57) ABSTRACT

The present invention relates to a process for producing a nonwoven fabric, comprising the steps of:
(a) extruding a plurality of filaments from a spinneret;
(b) depositing said filaments in a substantially not-crimped condition to make a nonwoven fabric on an element collecting the filaments;
(c) heating said nonwoven fabric to crimp at least part of the filaments, so that the volume of said nonwoven fabric is increased;
(d) bonding said nonwoven fabric;
wherein said filaments are at least bicomponent filaments.

10 Claims, 4 Drawing Sheets

PROCESS AND AN APPARATUS FOR THE PRODUCTION OF A VOLUMINOUS NONWOVEN FABRIC

The present invention concerns a process and an apparatus for producing a nonwoven fabric and, in particular, voluminous nonwoven fabrics obtained by the spunbond process.

As known, spunbond fabrics are obtained by extruding, drawing and depositing a plurality of filaments of plastic material on a conveyor belt. The filaments laid down on the belt are then constrained together at a plurality of points by different processes, such as for example by calendering, applying air or water jets, or welding, etc.

A typical plant for producing spunbond filaments comprises a spinning head fed by extruders, a drawing unit and a deposition unit for depositing the drawn filaments on a movable support (collecting surface) where the nonwoven fabric is formed.

The nonwoven fabrics of spunbond type are used in various fields, such as for example medical and sanitary ones, but also in the geotechnical field, in civil engineering, in building construction. Depending on the application, the nonwoven fabric must have different mechanical features relating to finishing, resistance to particular agents, etc., so as to meet the different requirements of the areas of use. Nonwoven fabrics are known in the art which are made from filaments formed by two or more components, so as to be able to exploit different characteristics of the employed materials.

It is known, for example, to arrange two polymer materials in side-by-side arrangement. In the side-by-side design, two polymer materials are coextruded so as to form a multicomponent filament in which the two materials form two sub-filaments next to each other. Typically, the multicomponent filament has circular section and the two sub-filaments have semicircular sections. In other words, the section of the contact surface between the two filaments substantially coincides with the diameter of the section of the multicomponent filament. It is also known to vary the ratio between the two components. In this case, the contact surface between the two sub-filaments coincides with a chord of the circular section of the multicomponent filament. Similar side-by-side filaments are described, for example, in U.S. Pat. No. 5,382,400 and US 2013/0029555.

It is further known to select the materials of the two sub-filaments with different characteristics so as to cause the multicomponent filament to crimp. Such a shape is used for providing the final nonwoven fabric with increased softness and volume, among other things.

For example, the two sub-filaments can be made up of materials having different features, whereby the multicomponent filament is initially extruded and drawn, thus forming a not-crimped continuous filament. When the multicomponent filament is deposited on the collector, the two sub-filaments behave differently, thus crimping the multicomponent filament.

Similarly, the two sub-filaments may be made up of materials having different coefficients of thermal expansion. If the multicomponent filament is subjected to thermal treatment, the two sub-filaments expand/shrink in a different way with respect to one another thus crimping the multicomponent filament.

Additionally, it is known to manufacture the two sub-filaments of materials different from one another, resulting in uneven stresses between the two sub-filaments during the extrusion and drawing steps that cause the multicomponent filament to be crimped.

Processes are known, wherein the crimp develops before depositing the fibers on the collecting belt, as described in US2009/0152757 and US2008/0210363 in the name of Reifenhauser. In fact, such documents teach to exploit a diffuser for activating the natural fiber crimp, the diffuser being arranged downstream of the means for drawing the filaments that are therefore deposited already crimped on the conveyor belt, to be then further crimped by appropriate treatments (thereby making a so-called "primary crimping", before depositing, and a "secondary crimping", after depositing). However, the treatment of fibers already crimped is complex and does not lead to satisfactory results. Moreover, processes are known for crimping even materials having low reciprocal adhesion properties. For example, U.S. Pat. No. 3,458,390 teaches to make side-by-side multicomponent filaments in which the contact surface between the two filaments provides a shape coupling (by means of "undercuts"), so as to mechanically constrain or entangle the sub-filaments to one another. Therefore, the two sub-filaments are bonded by such mechanical constraint and do not split during the required treatments (for example thermal treatments). It is difficult to obtain such a shape. Moreover, excessive stress may cause the undesirable splitting of the multicomponent filament. Finally, it is not known how to make a nonwoven fabric by such multicomponent filament.

Therefore, it is an object of the present invention to make a spunbond nonwoven fabric having high crimping level and thus high volume level. It is a further object of the present invention a spunbond method allowing this nonwoven fabric to be simply and economically produced.

These and other objects are achieved by the present invention by means of a process and an apparatus according to independent attached claims. Preferred aspects are set forth in dependent claims.

According to an aspect of the present invention, a process for producing a nonwoven fabric comprises the steps of:
(a) extruding a plurality of filaments from a spinneret;
(b) collecting the filaments in a substantially not-crimped condition to make a nonwoven fabric;
(c) carrying out a thermal treatment of the nonwoven fabric to increase the volume of the nonwoven fabric, comprising at least the step of heating said nonwoven fabric;
(d) bonding the nonwoven fabric.

In particular, during step (c), at least part of the filaments of the nonwoven fabric develops a "crimp" so that the volume of the nonwoven fabric is increased. In other words, the invention provides for depositing the filaments in a not-crimped condition to form a substantially flat nonwoven fabric (i.e. mainly bidimensional) and treating them to increase the nonwoven fabric volume, that is for making a voluminous nonwoven fabric.

Typically, at least steps (a)-(c) are carried out sequentially, whereas the steps (c) and (d) can be carried out sequentially or contemporaneously by the same device. Moreover, the steps (c) and (d) can be carried out also in a different equipment or anyway at a time very apart after step (b). In other words, the use of an equipment to carry out steps (a) and (b) can be provided in such a way to obtain a semifinished product usable in the following, for example in a different equipment, to carry out steps (c) and (d).

It has to be noted that the difference between the crimped condition and the not-crimped condition of a filament is known to the field technician and, in particular, the filaments in the not-crimped condition are substantially free of loops. On the contrary, crimped filaments have a plurality of loops and a wavy and irregular pattern, whereby the length of a crimped filament is appreciably lower than the length of the same filament in not-crimped condition.

The filaments of the present invention are deposited in a not-crimped way. Therefore the not-crimped filaments, when deposited, have a "crimp percentage" typically higher than 50%, and preferably higher than 70%. The "crimp percentage", known in the art, can be for example measured by making two signs spaced from one another on a filament to be tested and measuring the distance between the two signs along a straight line. The same filament is then extended (i.e. it becomes straight) and the distance between the two signs is measured again. The percentage ratio between the first value and the second value of the distance, as known, is the value of the "crimp percentage".

Another definition of crimped filaments is provided, for example, in the Reifenhauser's Application US20090152757, according to which the filaments are considered "crimped" if they have a curvature radius lower than 5 mm in the relaxed condition.

According to a possible aspect, an entangling step is carried out, at least partially, to entangle filaments laid down before making a thermal treatment. Such initial entangling can be carried out, for example, by a couple of rollers between which the nonwoven fabric is passed, then providing a first packing and pre-setting (i.e. pre-bonding) of the nonwoven fabric. A constraint or entangling stronger than what can be obtained with the mentioned couple of rollers between the filaments can be made by an appropriate constraining or entangling device; for example, suitable devices are selected from a needle loom and an ultrasound device.

Preferably, in case of presence of the constraining or entangling device, a first setting of the nonwoven fabric happens, such that the crimping of the filaments is allowed during the following thermal treatment and another setting of the nonwoven fabric happens after the thermal treatment (i.e. after the filaments have been crimped and the volume of the nonwoven fabric has increased), so that to set the final shape of the nonwoven fabric.

An aspect of the present invention is therefore a process for producing a voluminous nonwoven fabric, comprising the steps of extruding a plurality of bicomponent filaments from a spinneret; collecting said drawn filaments on a collecting surface to form a nonwoven fabric; subjecting said nonwoven fabric to a step providing an at least partial entanglement of the filaments; increasing the volume of said at least partially entangled nonwoven fabric by means of at least one thermal treatment and bonding (i.e. setting) the bulked ("voluminized"—increased in volume) nonwoven fabric.

The heating step is carried out at a temperature selected as a function of the type of polymer used in the filament production; suitable temperatures are generally between 80 and 190° C., as a function of the melting points of polymers used in producing the nonwoven fabric.

According to a particular aspect of the present invention, the thermal bulking treatment of the nonwoven fabric provides for a pre-heating step of the nonwoven fabric preceding the heating step, carried out at a temperature lower than the heating step. Typically, the temperature difference between the pre-heating step and the heating step is higher than 5 degrees, preferably higher than 10 degrees Celsius. According to a preferred aspect, the heating step (c) is carried out by a drum oven, wherein the nonwoven fabric is fed to a rotary drum and hot gas is directed radially with respect to such drum, typically in a direction centripetal with respect to the drum, so that to cross the nonwoven fabric being on the drum and the drum itself. The heating step aids the crimp development and also the setting of the structure of the nonwoven fabric.

This setting can be completed in the heating step or can be carried out inside an apposite bonding device to bond the nonwoven fabric, typically by at least one calender. In possible implementations, both mentioned setting methods are carried out.

The pre-heating step promotes the volume increase of the nonwoven fabric volume via the crimp development, in particular in case wherein the treatment time inside the drum oven (or similar heating means) is not sufficient to guarantee an appropriate crimping.

In an embodiment, the pre-heating step is carried out by passaging the nonwoven fabricinside a device in which heated gas, preferably air, is directed against the nonwoven fabric along an angled direction, preferably perpendicular to the plane along which the nonwoven fabric moves forward. According to a possible aspect, the flow direction of the hot air is directed contrary to the gravity, i.e. from bottom to top through the movable belt supporting the nonwoven fabric, in order to aid the bulking ("voluminization"—increase of volume) of the nonwoven fabric. Alternative embodiments in which the gas flow is oriented substantially coincident with the gravity are not excluded, or anyway from top to bottom. In other words, the heating is preferably carried out by a drum oven, whereas the pre-heating is preferably carried out by a different device with straight forward movement of the nonwoven fabric.

On the contrary, in possible embodiments only the drum oven is used. In this case the filament crimping of the nonwoven fabric and the consequent bulking of the nonwoven fabric happen substantially inside the oven itself. In an embodiment, the oven comprises two rotary drums, in another embodiment there are two drum ovens in series.

In a preferred embodiment, therefore the process of the invention provides the following steps in succession:
 (a) extruding a plurality of filaments from a spinneret, wherein the filaments preferably comprise two sub-filaments adhered to each other and arranged in accordance with a side-by-side configuration, wherein the contact surface between the two sub-filaments, in the cross-section of the filament, is substantially wave-shaped and/or the melting temperature difference of the materials of the two sub-filaments is at least 10° C.;
 (b) collecting the filaments in a substantially not-crimped condition to form a nonwoven fabric;
 (b') carrying out a constraining or entangling step of the deposited filaments,
 (c) thermal treating the nonwoven fabric to increase the volume of the nonwoven fabric, comprising at least one step (c2) of heating the nonwoven fabric, and preferably comprising a pre-heating step (c1) before the mentioned step (c2) of heating the nonwoven fabric;
 (d) optionally, bonding the nonwoven fabric.

As previously described, the constraining or entangling step (b') can be carried out by a couple of rollers between which the nonwoven fabric is passed and/or by an entangling device, preferably selected between a needle loom and an ultrasound device. Among the possible listed solutions the ultrasound device is the preferred one, since it allows the filaments to be constrained more precisely and allows to define entangled points (or zones) on the nonwoven fabric among the filaments more simply. In particular, thanks to an ultrasound device, the distance between the various entangled points among the filaments of the nonwoven fabric can be adjusted. During the crimping step, as a matter of fact, the volume (and in particular the thickness) of the nonwoven fabric increases at the portions not-constrained, i.e. not-entangled, to one another, whereas the thickness of the nonwoven fabric remains substantially unchanged at the entangled points or zones (thereby forming a "quilted" effect).

In case of presence of both the elements (couple of rollers and constraining device), the constraining device is arranged downstream of the couple of rollers.

In particular, an aspect of the invention provides for carrying out the not-crimped deposit of bicomponent filaments having side-by-side configuration as described above, carrying out a first constraint between the same, preferably by using at least one constraining device such as a needle loom or an ultrasound machine, thermically treating the nonwoven fabric (by heating it) so that the filaments are crimped so that the volume, in particular the thickness, of the nonwoven fabric itself is increased. The thermal treatment is preferably carried out in two steps, i.e. the pre-heating and the heating.

The presence of an at least partially constraining or entangling step (in particular by needlefelting or ultrasound treatment) allows some structural stability to be conferred to the nonwoven fabric. Thanks to this, the non-woven fabric subjected to "entangling" but not yet bulked by heating, can be for example wound on the spool and can preserve the spool shape (or other shape adapted to be transported, stored and the like) until the use time. Therefore, the nonwoven fabric can be transported, stocked and usually maintained in a not-voluminous shape (i.e. having a flat shape) and then be put again in a treating plant to be bulked and undergo possible finishing operations (such as the cutting of the nonwoven fabric for producing an item with such a nonwoven fabric).

More in detail, during the thermal treatment, the filaments of the nonwoven fabric crimp and the nonwoven fabric increases its volume, in particular it increases its own thickness. Such thickness increase can be limited (or substantially absent) at the points treated by the constraining or entangling device. In other words, the constraining device (needle loom or ultrasound machine) constrains the filaments of the nonwoven fabric one to another in some points, and the volume increase of the nonwoven fabric during the thermal treatment occurs around these points; therefore the bulked nonwoven fabric will have an appearance reflecting the presence of more bulgy or less bulgy zones, where the less bulgy zones are those partially constrained. Therefore, by adequately selecting where the constraining device has to operate, some structural stability can be imposed to the nonwoven fabric, so that the storage and the transportation are facilitated.

In addition to a process for making a nonwoven fabric, an aspect of the present invention relates to an apparatus for making a nonwoven fabric.

According to an aspect, an apparatus for producing a nonwoven fabric comprises a spinneret for extruding a plurality of filaments, means for collecting the filaments and forming a nonwoven fabric, at least one thermal treatment device for thermally treating the nonwoven fabric, at least one bonding device to bond the nonwoven fabric; the at least one thermal treatment device comprises at least one heating device configured to direct gas, preferably air, on the nonwoven fabric at a temperature preferably between 80 and 190° C.

According to a possible aspect, the heating device comprises a drum oven provided with a rotary drum for receiving the nonwoven fabric, and means for generating a heated gas flow, preferably air, towards the side surface of the rotary drum, preferably in a substantially radial direction with respect to the rotary drum.

According to a possible aspect, the apparatus comprises a pre-heating device configured to direct the gas, preferably air, against the nonwoven fabric at a temperature between 70 and 185° C.

According to a possible aspect, the pre-heating device comprises at least one first surface arranged substantially parallel to the forward direction of the nonwoven fabric and means for generating a gas flow in a direction substantially incident to the forward direction of the nonwoven fabric, preferably substantially perpendicular to the mentioned forward direction (D) of the nonwoven fabric.

According to a possible aspect, said pre-heating device comprises a second surface arranged substantially parallel to the first surface, and the first and second surfaces are arranged so that, in use, the nonwoven fabric moves forward along said forward direction between the first and second surfaces. Preferably, the distance between the mentioned first and second surfaces is variable, to have the possibility of adapting to the bulking of the nonwoven fabric.

According to a possible aspect, a device for cooling the nonwoven fabric is arranged downstream of the pre-heating device. Such a cooling device is arranged so that a gas flow is directed along a direction incident, preferably substantially perpendicular, to the forward direction of the nonwoven fabric.

According to a possible aspect, the apparatus spinneret is arranged so that a bicomponent filament is extruded, the latter comprising two side-by-side arranged sub-filaments in which the contact surface between the two sub-filaments has a substantially wave-shaped cross section.

According to a possible aspect, a device for constraining the filaments one to another, preferably selected between a needle loom and an ultrasound machine, is arranged upstream of the heating device and also of the pre-heating device, if present.

According to a possible aspect, the constraining device and at least one between said pre-heating and heating devices can be arranged in a condition of disengagement from the nonwoven fabric so that a treatment on the latter is not carried out.

Exemplary and not limiting embodiments of the present invention are now illustrated with reference to attached figures, in which.

Figure 4B:
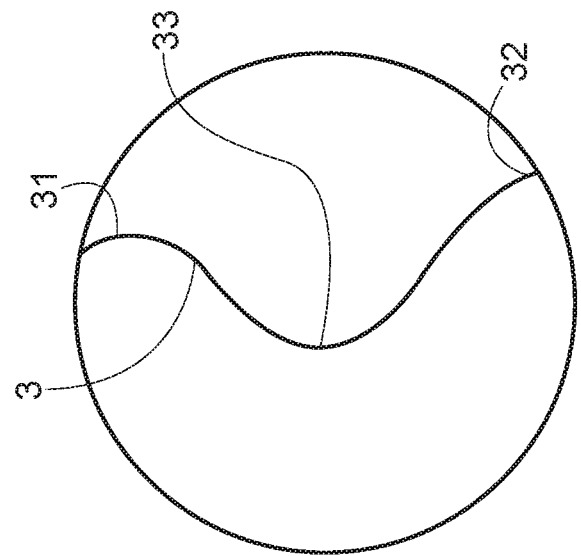
Figure 4A:
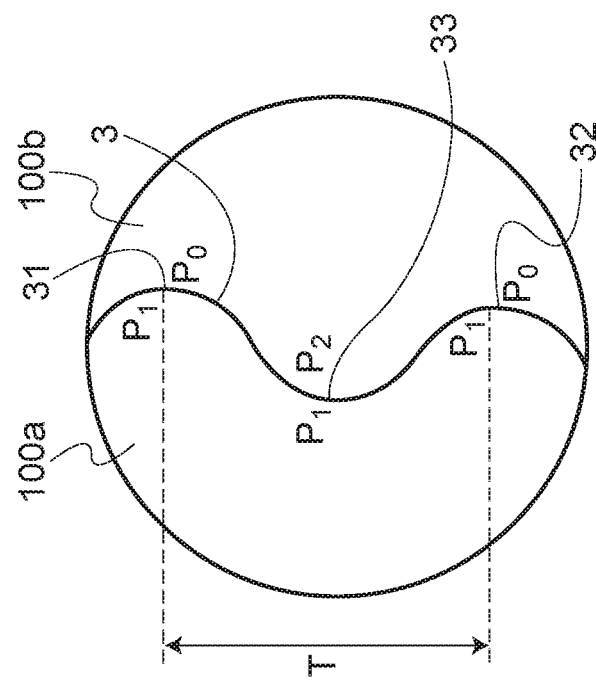

FIGS. 4*a* and 4*b* are sectional views of possible filaments usable to form a nonwoven fabric with an apparatus according to the present invention.

An apparatus 10 for producing a nonwoven fabric 150 comprises, as known, a device 1 for extruding continuous filaments 100 and for depositing them on collecting means 2. For this purpose, various devices 1 known in the art can be used. For example, it is possible to use the devices described in the Applications WO2008/072278 and WO2008/075176.

In general, such devices have a spinneret 1*a* for extruding a plurality of filaments 100, typically followed by a drawing unit 1*b*. Generally, a cooling zone, not shown and known in the art per se, is arranged upstream of the drawing unit to direct air flows to the filaments 100 after the extrusion from the spinneret 1*a*, so that they are cooled appropriately. A possible cooling chamber usable in the present invention is for example described in the Patent EP1939334; such Patent describes also a filament extruding and collecting device adapted to be used in the present invention.

Below the device 1 there are the collecting means 2, typically in the form of conveyor belt or the like. The collecting means 2 are typically pierced or anyway gas-permeable. Appropriate means, not shown in detail and typically in the form of aspirator or similar element, can be provided below the collecting means 2 so that a depression is created at the zone in which the filaments 100 are deposited on the same collecting means 2.

A couple of rollers 9 can be arranged at the collecting means 2, so that a first setting (constraining) and sizing of the nonwoven fabric can be carried out. The rollers 9 can further prevent (or at least limit) the air inflow from the outside of the device 1 for the extrusion and deposit of the filaments towards the inside of the device itself. In particular, the air inflow is prevented or limited from the outside of the device 1 to the collecting device 2, which has a depression zone adapted to promote the filament deposit. In other words, the rollers 9 can be placed in contact with the nonwoven fabric thus providinf some airtightness, so that the air inflow from the outer environment to the inside of the device 1 is limited. The depression inside the device 1, provided at the collecting means 2, anyway draws mainly the air already present inside the device 1 itself.

The continuous filaments 100 can be differently shaped. The filaments can be mono-component or multi-component. In a preferred implementation the continuous filaments 100 are bi-component, i.e. they have two sub-filaments 100*a*, 100*b* coupled one another. The bicomponent filament 100 can have different configurations, for example core-sheath or, more preferably, side-by-side.

According to an aspect of the present invention shown in the figures, the filaments 100 comprise two sub-filaments 100*a*, 100*b* made by coextruding two typically polymeric materials. The sub-filaments 100*a*, 100*b* are arranged in side-by-side configuration. A particular configuration of the filaments 100 is described in detail in the copending Application EP16198713.

In particular, the materials for the two sub-filaments 100*a*, 100*b* are preferably selected among PP, coPP, PE, CoPE, PET, CoPET, PA, PLA. Preferred combinations are: PP/PE, PP/CoPP, PP/PP, PET/PP, PET/CoPET, PA/PP, PLA/PP, PLA/PE. According to a preferred embodiment, the materials of the sub-filaments 100*a*, 100*b* are selected so that the crimping of the latter is allowed during a thermal treatment. This is preferably obtained by at least one of the following features: the difference of the melting temperature of the sub-filaments 100*a* and the melting temperature of the sub-filaments 100*b* is at least 10° C., and preferably at least 20° C.; the viscosity of the two materials of the sub-filaments 100*a*, 100*b* is different, preferably the difference being higher than 20% when measured by the same method and in the same conditions. For example, the two materials can be tested with the same viscometer (for example a rotational or capillary one) or, more in general, the viscosity can be determined by a common method defined in a recognized standard (for example, ASTM D3835). In other words, for the sub-filaments, polymers can be selected having different melting point and similar viscosity, or polymers with equal or similar melting point but different viscosities, or else two polymers having different melting points and viscosities. As mentioned, the preferred configuration of the two sub-filaments 100*a*, 100*b* is the side-by-side one providing the two sub-filaments being next to each other so that, in section, the two sub-filaments 100*a*, 100*b* are divided by a line representing the contact surface 105. According to a preferred aspect of the invention, the contact surface 105 is waveform, i.e. a configuration containing at least one inflection point. In other words, the shape of the cross-section of the contact surface shows at least one peak 101, 102 alternating with at least one trough 103. As known, "peaks" and "troughs" are the crests 101, 102, 103 formed by the wave, i.e. the maxima and the minima. The peaks 101, 102 are directed in the opposite direction with respect to the troughs 103. It should be noted that, typically, the difference between troughs 103 and peaks 101, 102 is given only by the orientation chosen for the section of the filament.

According to an aspect of the present invention, the section of the contact surface 105 forms a wave with at least three crests 101, 102, 103; in particular, in preferred embodiments there are exactly three crests 101, 102, 103. For convenience sake, two peaks and one trough will be referred to.

According to an aspect, the period T of the wave is between 40% and 100% of the length of the diameter of the multicomponent filament 100. It should be noted that, for convenience sake, reference will be made to the "diameter" of the multicomponent filament 100. However, the following description can be applied also to the case of a not-circular filament section. In this case, the "diameter" should be considered as the greatest dimension of the section. If the troughs 103 and the peaks 101, 102 have the same length, then as a result the length of each trough and peak is preferably between 20% and 50% of the diameter (i.e. between ⅕ and ½ of the diameter).

As known, the period "T" of the wave is the sum of the lengths of a tough and a peak. The period T may also be measured as the distance between two subsequent peaks (or toughs).

More in general, according to an aspect of the present invention, the contact surface 105 changes at least once its own curvature, i.e. has at least one inflection point. Typically, the section of the contact surface covers at least one period of the waveform. More preferably, the contact surface has at least two peaks and one trough, thus covering at least 1.5 periods of the waveform. In a possible embodiment, the waveform meets the edge of the filament section at the middle point between trough and peak, i.e. far from the trough and/or peak adjacent to the edge.

In a preferred embodiment shown in FIG. 4*a*, the waveform is substantially sinusoidal. It should be noted that, due to the small size of the filament section, the waveform will actually approximate to a sinusoid. In particular, in FIG. 4*a* the ideal shape of the section of the filament 100 is shown, having length of 1.5 periods and strictly sinusoidal form. In FIG. 4*b* a possible real pattern of the section of the contact surface 105 is shown, the wavelength of the contact surface being little greater than the T period, the peaks being cut at the section edge and the waveform approximating a sinusoid without strictly complying with geometrical parameters thereof.

The apparatus 10 further has various devices 3*a*, 3*b*, 4*a*, 4*b*, 5, 6*a*, 6*b*, 7, 8 for treating the nonwoven fabric obtained from the deposit of the filaments 100.

In particular, the apparatus 10 can have a device 3a, 3b for constraining at least part of the filaments 100 one to another, i.e. for carrying out a so-called "entangling" between them. In the art different typologies of constraining or "entangling" devices 3 are known, and in particular mechanical, hydraulic (hydroentangler) or thermal devices. Preferably, according to an aspect of the present invention, the constraining device is selected between a needle loom 3a and an ultrasound machine 3b. The device 3a, 3b is particularly useful in case wherein specific constraints among the filaments are required, or the afore described step c) and d) must be carried out in a different equipment or anyway in a subsequent time.

The apparatus 10 comprises at least one heating device 4b of the nonwoven fabric 150 and, preferably, also a pre-heating device 4a placed upstream of the heating device 4a. In case of presence of the constraining device 3a, 3b, the heating and pre-heating devices 4a, 4b are arranged downstream of the former. In an embodiment, the pre-heating device 4a is configured to heat the gas to be directed on the nonwoven device at a temperature between 70 and 180° C., whereas the heating device is configured to heat the gas to be directed against the nonwoven fabric at a temperature between 90 and 190° C.

According to a particular embodiment, the pre-heating device 4a has at least one first supporting surface 41a for the nonwoven fabric 150, on which the nonwoven fabric 150 is arranged. The surface 41a is typically movable so that to match with the movement of the nonwoven fabric 150. The surface 41a is further typically gas-permeable, so that the passage of a flow of gas G1 is facilitated, as better described in the following, through the nonwoven fabric 150.

The embodiment shown in the figures further has a second surface 42a arranged substantially parallel to the forward direction D of the nonwoven fabric 150. The two surfaces 41a, 42a are arranged so that the supporting surface of the nonwoven fabric 150 (i.e. the first surface 41a in the shown embodiment) is arranged below the nonwoven fabric 150, and the other surface (i.e. the second surface 42a in the shown embodiment) is arranged above the nonwoven fabric 150. The second surface 42a is preferably movable, too, so that to match the movement of the nonwoven fabric 150 along the travel thereof.

Even if the preferred embodiment provides two surfaces 41a, 42a in contact with the nonwoven fabric 150, possible embodiments are anyway possible in which only one surface contacts the latter. In particular, embodiments are possible in which the nonwoven fabric 150 contacts only one surface arranged below such a fabric, i.e. embodiments not having, with reference to that shown in the figures, the second surface 42a.

The pre-heating device 4a is further provided with means 45a for supplying or generating a flow of gas G1, typically air, to the nonwoven fabric. The means 45a are particularly configured to heat the flow of gas G1 to a temperature between 70 and 180° C. Such means are known in the art and herein not discussed in detail. Typically the means 45a are arranged so that to supply or generate a flow of gas G1 incident to the nonwoven fabric 150, and preferably a flow of gas G1 substantially perpendicular to the nonwoven fabric 150. The flow of gas G1 is typically oriented so that to cross the nonwoven fabric along a direction opposite to the gravity, i.e. from bottom to top. The nonwoven fabric is then urged by the flow of gas G1 upwards, so that its volume increase is favored.

According to a particular aspect, the pre-heating device 4a has a portion 43a arranged, in use, below the nonwoven fabric 150 and another portion 44a that, in use, is arranged above the nonwoven fabric 150. Preferably, at least one of the two portions 43a, 44a is further movable with respect to the nonwoven fabric 150 along a direction perpendicular to the forward direction D of the nonwoven fabric itself. In other words, the distance between the two portions 43a, 44a, and in particular between the surfaces 41a, 42a, is adjustable. In the shown embodiment, only the portion 44a being, in use, arranged above the nonwoven fabric 150, is movable perpendicularly to the nonwoven fabric 150.

It should be noted that the means 45a for creating a gas flow are schematically shown coupled with the portion 43a arranged below the nonwoven fabric 150. However, the arrangement of such means (for example suctioning means) in the portion 44a above the nonwoven fabric 150 is not excluded, or both the portions 43a, 44a may be provided with means 45a for generating or supplying a flow of gas G1. Moreover, in not shown variations of the present invention, the pre-heating device 4a may be completely arranged above or below the nonwoven fabric 150, in particular in case wherein such device 4a is provided with a single surface 41a through which the flow of gas G1 passes.

Moreover, in further alternative embodiments, the flow of gas G1 can face downwards and in particular substantially in parallel and with the same way of the gravity, i.e. being oriented in the same way of the gravity.

As mentioned, the flow of gas G1 is preferably an air flow.

According to a possible aspect of the present invention, the pre-heating device 4a is coupled to a cooling device 5. The cooling device 5 can be configured in a similar manner with respect to the pre-heating device 4a and use a gas flow. The cooling device 5 can further have at least one surface 51, 52 and preferably two surfaces 51, 52 arranged in parallel to the forward direction D of the nonwoven fabric, the two surfaces being preferably movable. The cooling device 5 is further provided with means 55 for generating a flow of gas G3, preferably air, at ambient temperature or anyway lower than the temperature of the flow of gas G1. Preferably the temperature of the flow of gas G3 is between 30 and 140° C.

The flow of gas G3 can have direction incident to the nonwoven fabric 150 and, preferably, substantially perpendicular to the nonwoven fabric 150. The flow of gas G3 is also oriented to cross the nonwoven fabric along a direction opposite to the gravity, that is from bottom to top, even if the possibility of directing the flow of gas G3 from top to bottom is not excluded.

As mentioned, the apparatus 100 is provided with a heating device 4b provided with means 42b for generating a flow of gas G2, preferably air, directed against the nonwoven fabric 150. In an implementation, such flow of gas G2 has temperature between 80 and 190° C.

Preferably, the heating device 4b comprises at least one drum oven. In particular, the heating device 4b is preferably provided with a rotary drum 41b adapted to receive and carry the nonwoven fabric 150 into the oven itself.

The heating device 4b further has means 42b for generating a flow of gas G2 heated to a temperature between 80 and 190° C. The gas flow is preferably directed radially with respect to the rotary drum 41b. Typically, such flow of gas G2 is directed towards the centre of the rotary drum 41b, so that to cross the nonwoven fabric and the drum.

Such means 42b, known in the art, can be arranged for example inside the drum 41b so that to suck a properly heated flow of gas G2, or outside thereof, such that a flow of gas G2 is forced against the drum 41b.

Preferably, at the inlet of the heating device 4b there is a roller 6a adapted to direct the nonwoven fabric 150 into the same device. According to a possible aspect, the roller 6a is provided with an air suctioning system, such that the nonwoven fabric 150 is attracted and cooled at the same time. The roller 6a generally has size smaller than the rotary drum 41b.

Analogously, a roller 6b is preferably arranged at the outlet of the nonwoven fabric from the heating device 41b. Such a roller can have an air suctioning system, too, such that the nonwoven fabric 150 is attracted and cooled at the same time.

Generally, when there are both the pre-heating and heating devices 4a, 4b, preferably first cooling means 5, 6a are arranged between them. In the shown embodiment, such first cooling means 5, 6a comprise the afore described cooling device 5 and roller 6a. Anyway, embodiments in which there is only one of such first cooling means are possible, and also embodiments in which cooling means different from the cooling device 5 and the roller 6a are arranged between the two heating devices 4a, 4b.

Downstream of the heating device(s) 4a, 4b, a bonding device 7 is arranged. Various bonding devices are known in the art and can be used in the present invention such that the nonwoven fabric layer is set.

According to a preferred aspect, the bonding device 7 comprises a calender. Such calender can have reliefs so that the nonwoven fabric is embossed, such an embossing being adapted to provide the nonwoven fabric with various cohesion points without impairing the crimping effect previously obtained.

Preferably, there are second cooling means 6b, 8 between the heating device 4a, 4b and the bonding device 7. Such second cooling means can comprise the previously described roller 6b and/or a cooled conveyor belt 8. The conveyor belt 8 can be cooled thanks to means known in the art and herein not described in detail, for example air suctioning means can be used.

In addition or substitution of the roller 6b and/or the belt 8, different means for cooling the nonwoven fabric 150, known in the art, can be used.

Figure 3:
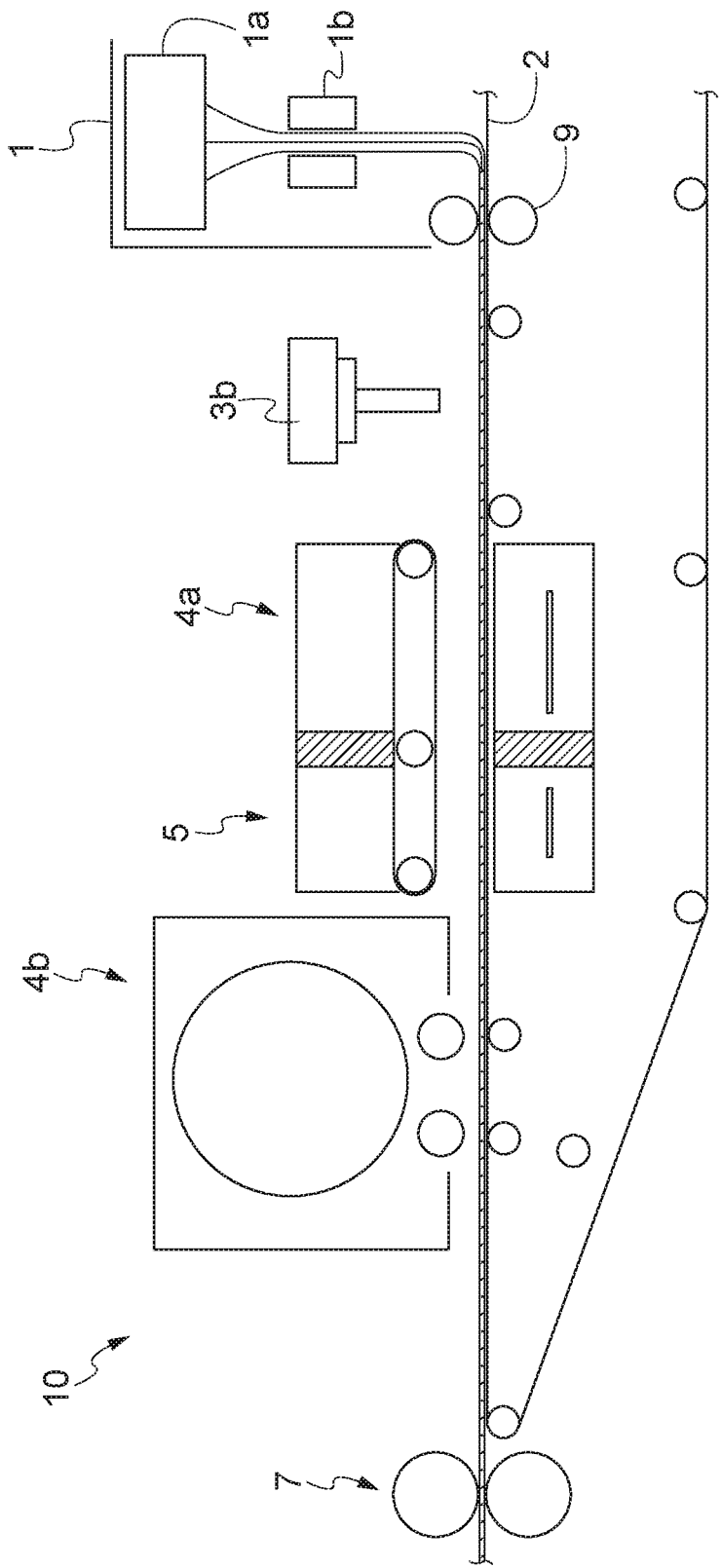
FIG. 3 is a schematic view of the apparatus of FIG. 2, in which the constraining and pre-heating devices are arranged in a configuration of disengagement from the nonwoven fabric carried by the collecting means.

According to a possible embodiment shown in FIG. 3, the constraining device 3a, 3b and the pre-heating and heating device(s) 4a, 4b can be arranged in a condition of disengagement from the nonwoven fabric 150. This allows the apparatus 100 to operate like a conventional apparatus for producing a spunbond nonwoven fabric according to the known art.

Typically, in such operative condition, the arrangement of the collecting means 2 is modified. In particular, in the embodiment of FIG. 3, the collecting means 2 are arranged on the apparatus 1 so that the nonwoven fabric 150 is moved at least up to the heating means 4b (the drum oven) and possibly up to the bonding means 7. In such conditions, in fact the filaments can be treated directly by the bonding device or can be treated also by the drum furnace, for example to further pre-set the nonwoven fabric or to dry the nonwoven fabric in case the latter has been treated with any agent; in such condition, the standard nonwoven fabric does not crimp inside the drum oven. The filaments 100, in use, are extruded from the spinneret 1a and deposited on the collecting means 2, typically after been passed through a drawing unit 1b.

Differently from known solutions, as those described in US2009152757 and US2008210363, the filaments 100 laid down on the collecting means 2 are deposited in a not-crimped condition, i.e. they are substantially free of loops when deposited on the collecting means 2. Therefore, the nonwoven fabric 150 deposited on the collecting means 2 has thickness typically comparable to that of the standard spunbond nonwoven fabrics made with mono- or bicomponent filaments.

As afore described, the filaments 100 are bicomponent filaments, having two sub-filaments 100a, 100b arranged in a side by side configuration, the contact surface being preferably wave shaped when seen in the cross section.

Referring to FIG. 4a, a possible method for obtaining a wave shape is now described in detail. In particular, the first sub-filament 100a is extruded under a constant pressure P1. The extrusion pressure, i.e. the spinning pressure, of the second sub-filament varies, for example in sinusoidal way, between two values P0 and P2. P0 is smaller than P1, whereas P2 is greater than P1. The second filament 100b forms a protrusion within the first sub-filament P1 where the second sub-filament is extruded under pressure P2 (i.e. under a pressure higher than the pressure of the first sub-filament 100a). Conversely, the first sub-filament forms a protrusion within the second sub-filament 100b where the second sub-filament 100b is extruded under a pressure P0 (i.e. a pressure lower than the pressure of the first filament).

For the sake of simplicity, an embodiment in which only the pressure of one of the two sub-filaments 100b is varied, has been described. However, in order to obtain a desired shape (e.g. wavy), the extrusion pressure can be varied at different areas of both the sub-filaments 100a, 100b. Generally, the second sub-filament forms a protrusion within the first sub-filament where the pressure of the second sub-filament is greater than the pressure of the first sub-filament, and vice versa.

The filaments 100, once laid down on the collecting means, form a nonwoven fabric 150.

According to a possible embodiment, the nonwoven fabric 150 can be treated by a couple of rollers 9. In particular, the filaments 100 are deposited on the belt in a random (loose) way, thus resulting in an irregular arrangement of the filament, showing however a substantially uniform density. At this point, the nonwoven fabric 150 has not undergone yet a constraining process of the filaments, whereby it is preferable to carry out a treatment compacting the filaments enough to be able to be subjected to subsequent treatments thereof.

For this purpose, the filament layer is passed through two rollers 9 so that a first constraint (or pre-set) of the filaments of the nonwoven fabric is effected. The upper cylinder can be provided with means for heating it to a temperature between 50° C. and 140° C., generally around 90° C., and anyway temperatures selected depending on the nature of the employed polymers and to provide a first filament cohesion.

As previously mentioned, the coupling between the rollers 9 and the nonwoven fabric preferably avoids, or at least limits, the ambient air inflow into the device 1, at the collecting means 2.

A constraining step 3a, 3b can be carried out between the deposit of the nonwoven fabric 150 and the heating inside the device 4b, by an adapted device known in the art. Preferred devices are selected between a needle loom 3a and an ultrasound machine or device 3b. Among these solutions, the preferred is an ultrasound machine 3b, i.e. a device for carrying out the so-called "ultrasonic bonding". Thanks to this machine, the filaments can be constrained to one another in different points or zones, in a particularly precise way. The thickness increase of the nonwoven fabric 150, as described above, occurs at the zones which have not been joined by the constraining or bonding device 3a, 3b. The thickness increase is therefore "guided", i.e. due to the precise definition of points or zones in which the filaments of the nonwoven fabric are constrained, the final shape of the nonwoven fabric following the filament crimping can be pre-determined, in certain limits. In general, a pattern of the points or zones in which the filaments are constrained to one another is preferably defined on the surface of the nonwoven fabric, and the ultrasound device 3b is particularly effective for this purpose. As described, by selecting such a pattern conveniently, the final shape of the nonwoven fabric can be determined by selecting which zones of the nonwoven fabric will increase their thickness appreciably during the following crimping of the filaments and which zones will keep, on the contrary, substantially the same thickness. An accurate and precise definition of the zones or points in which the filaments are constrained further allows the nonwoven fabric 150 not to be excessively stiffened, even after the constraining step. According to an aspect of the invention, the constraining device 3a, 3b can be arranged downstream of the rollers 9, or in substitution thereof.

Then, the nonwoven fabric is thermically treated by a heating device 4b and, more preferably, by a pre-heating device 4a and a heating device 4b.

Preferably, the thickness of the nonwoven fabric after the thermal treatment inside the device 4b (or the devices 4a and 4b) is at least 1.5 times the thickness of the nonwoven fabric 150 having not-crimped filaments before the heating step.

In particular, inside the pre-heating device 4a, the nonwoven fabric 150 undergoes a flow of gas G1 at a temperature between 70 and 180° C. Such temperature proves to be adapted to allow a first "activation" of the nonwoven fabric 150, i.e. to allow the crimping in the filaments 100 of the nonwoven fabric 150, so that their volume increases.

As mentioned, the flow of gas G1 is preferably directed from bottom to top, so that the thickness increase of the nonwoven fabric 150 is favored.

Preferably, in at least part of this step, the nonwoven fabric 150 is in contact with the pre-heating device 4a, both above and below, thanks to the first surface 41a and the second surface 42a, respectively; as described before, such surfaces are preferably movable so that the nonwoven fabric 150 is accompanied along its own travel inside the device itself.

Subsequently, the nonwoven fabric is sent to the heating device 4b so that the crimping, and therefore the expansion of the former, are completed and, preferably, in order to carry out a thermal pre-setting (thermobonding) of the nonwoven fabric 150.

Before the nonwoven fabric enters the heating device 4b, it can be cooled by appropriate cooling means 5, 6a. Such means can comprise, for example, a cooling device 5 adapted to direct a flow of gas G3 against the nonwoven fabric 150 and/or a suctioning roller 6a. In fact, in case the filaments of the nonwoven fabric are transported in a sufficiently not-solidified condition due to a high temperature, the filaments could attach to the device moving the nonwoven fabric.

Inside the heating device 4b, a flow of gas G2 at a temperature between 80 and 190° C. is directed against the nonwoven fabric 150. In general, when there are both the pre-heating device 4a and the heating device 4b, the operating temperature of the two devices (in particular the temperature between the flows of gases G1 and G2) can be different of at least 5° C. and preferably at least 10° C., and in particular the temperature in the heating device 4b is higher.

The nonwoven fabric 150 exiting from the heating device(s) 4a, 4b is sent to a bonding device 7, for example a calender, where the nonwoven fabric 150 is set. The nonwoven fabric 150, before being set, can be cooled, for example by one or more of the above described cooled belt 8 and suctioning roller 6b.

As mentioned above, there can be a number of variants, for example in an embodiment there is no pre-heating device 4a.

For example, in the absence of the pre-heating device 4a, the crimping can be activated inside the heating device 4b.

It has to be further noticed that a drum oven has been described as a heating device and a device with surface(s) parallel to the substantially straight forward direction D of the nonwoven fabric has been described as a pre-heating device, respectively.

However, by varying the temperature of the flow of gases G1 or G2, it is not excluded to use the parallel surface device as a heating device or to use the drum oven as a pre-heating device 4a.

Figure 1:
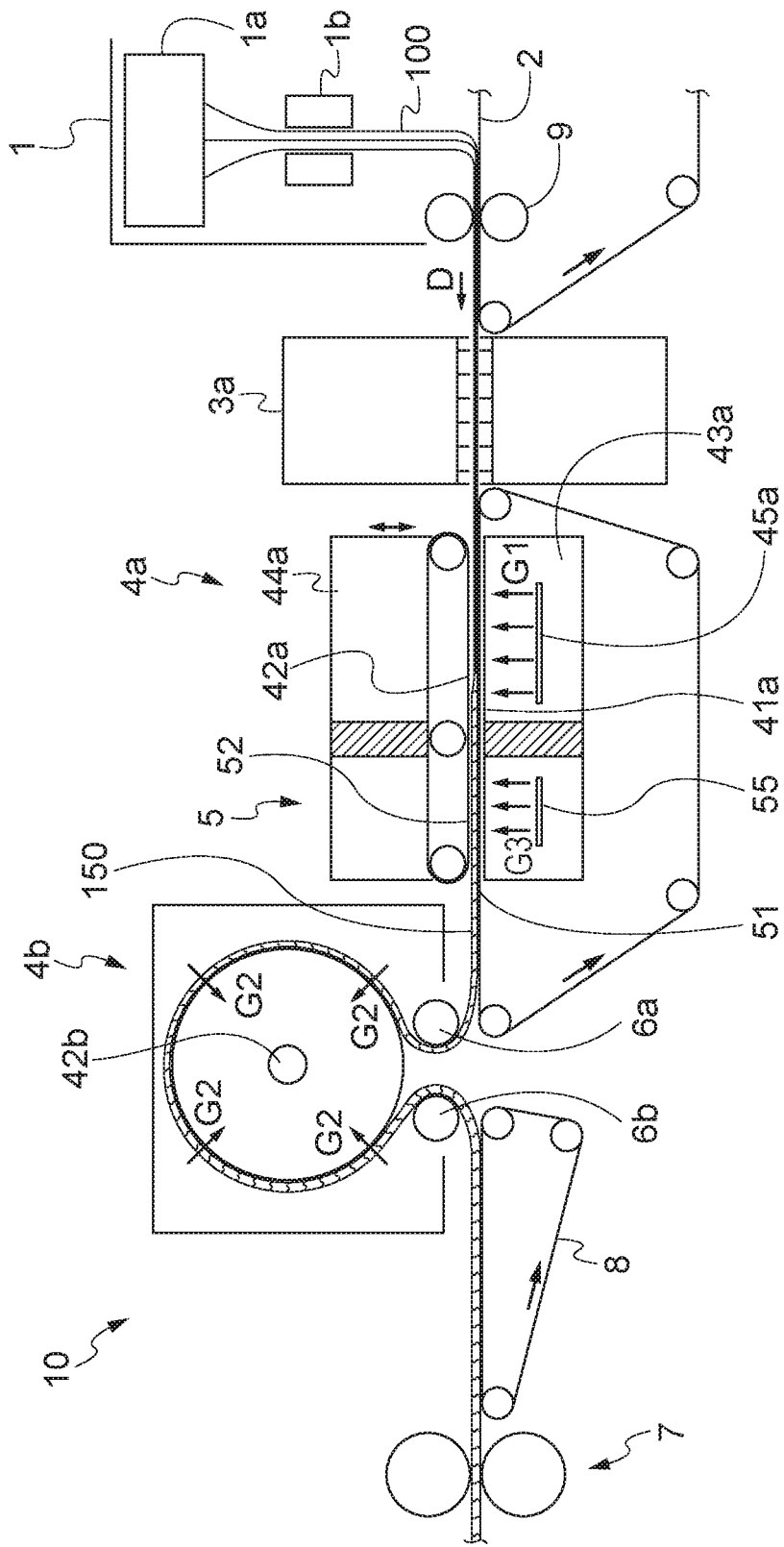
FIG. 1 is a schematic view of an apparatus for producing a nonwoven fabric according to a first embodiment.
Figure 2:
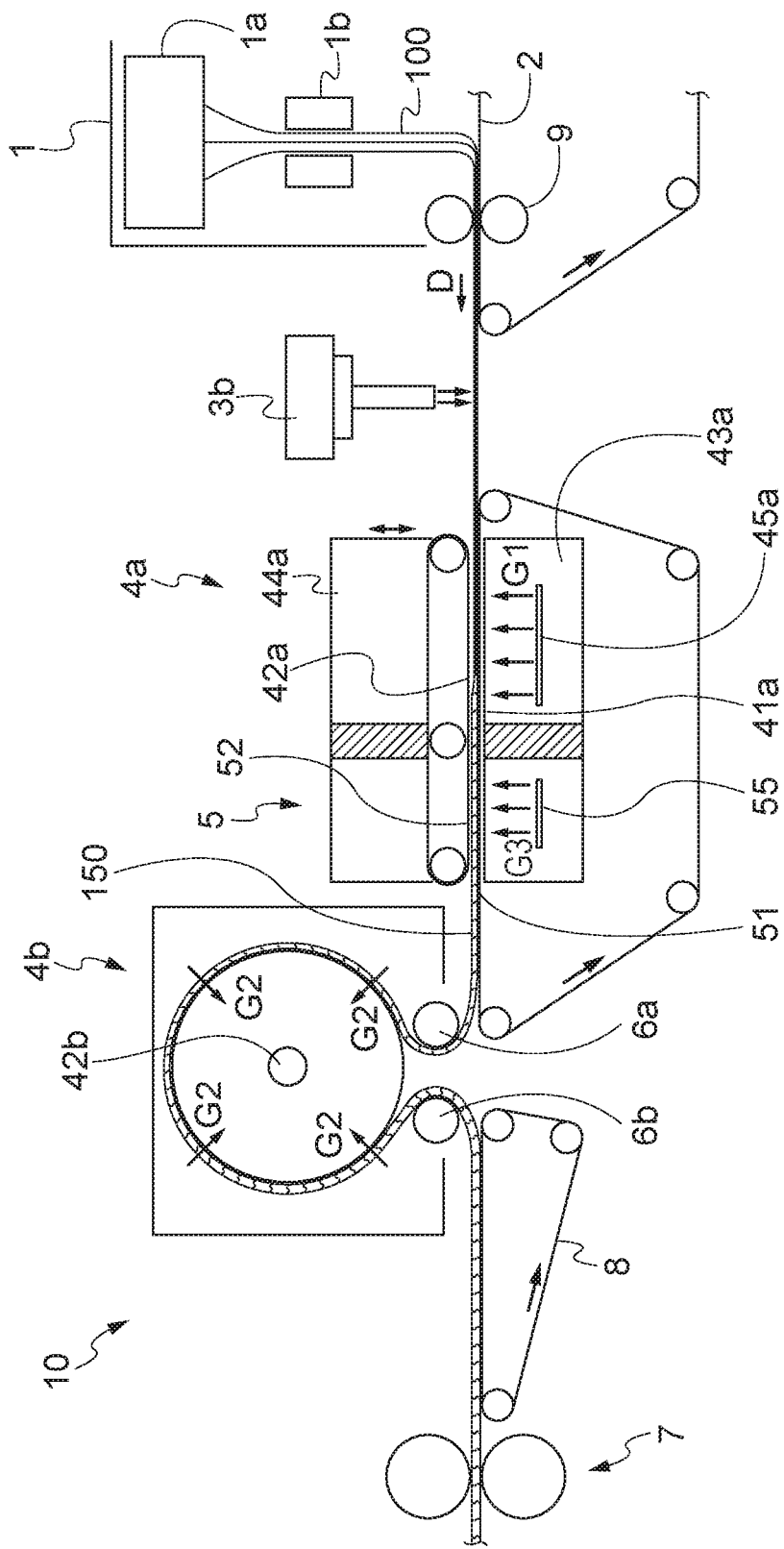
FIG. 2 is a schematic view of an embodiment alternative to that of FIG. 1.

For example, in a possible variation, two parallel surface devices similar to the device 4a shown in the figures can be used. In particular, the first device would operate analogously to the pre-heating device 4a of FIGS. 1 and 2 whereas the second device, placed downstream of the first one, would generate a gas flow at a temperature between 90 and 190° C., so that to operate as a heating device. In a further exemplary variation, two drum ovens placed in series are used, i.e. as the pre-heating and heating devices.

The invention claimed is:

1. A process for producing a nonwoven fabric, comprising the steps of:
   (a) extruding a plurality of filaments from a spinneret;
   (b) depositing said filaments in a substantially not-crimped condition to make a nonwoven fabric on an element collecting the filaments;
   (c) heating said nonwoven fabric to crimp at least part of the filaments, so that the volume of said nonwoven fabric is increased;
   (d) bonding said nonwoven fabric;
   wherein said filaments are at least bicomponent filaments,
   wherein said nonwoven fabric undergoes an entangling step providing an at least partial entanglement, before said heating step, and wherein said entangling step is carried out by a device selected among a couple of rollers, a needle loom and an ultrasound device,
   wherein said heating step comprises at least a first step of pre-heating said nonwoven fabric and a second step of heating said non-woven fabric,
   said first step of pre-heating preceding said second step of heating and being carried out at a temperature lower than the second step of heating,
   the temperature difference between the first step of pre-heating and the second step of heating being higher than 5 degrees, preferably being higher than 10 degrees Celsius.

2. The process according to claim 1, wherein zones that undergo an entangling step are arranged according to a pattern, and
   wherein the pattern provided by the entaglement before heating determines a final shape of the non-woven fabric by limiting areas of increase of volume of the web.

3. The process according to claim 1, wherein said at least partially entangled nonwoven fabric is stored before undergoing a heat bulking step.

4. The process according to claim 2, wherein said at least partially entangled nonwoven fabric is stored before undergoing a heat bulking step.

5. The process according to claim 1, wherein during said pre-heating step a gas flow is directed against said nonwoven fabric at a temperature lower than the temperature of the gas used in said heating step.

6. The process according to claim 1, comprising a cooling step of said nonwoven fabric between said step of pre-heating said nonwoven fabric and the step of heating said nonwoven fabric and/or between said step of heating said nonwoven fabric to crimp at least part of the filaments, so that the volume of said nonwoven fabric is increased and said step of bonding said nonwoven fabric.

7. The process according to claim 6, wherein said cooling step is carried out by cooling means comprising at least one among:
- a cooling device configured to direct a flow of gas against said nonwoven fabric at a temperature between 30 and 140° C.;
- a suctioning roller;
- a cooled conveyor belt;
- a suctioning roller.

8. The process according to claim 1, wherein during said step of extruding a plurality of filaments from a spinneret, a plurality of bicomponent filaments comprising two sub-filaments adhered to each other is extruded, said two sub-filaments being extruded according to a side-by-side configuration, so that a contact surface is formed between said two sub-filaments that is substantially curved or wave shaped in the cross section of the filament, said two sub-filaments being preferably made of materials having different melting temperature and/or different viscosity, said temperature difference being preferably of at least 10° C. and/or said viscosity difference being preferably higher than 20% when measured by the same method in the same conditions.

9. A nonwoven fabric obtainable by a process according to claim 1 wherein a plurality of bicomponent filaments comprising two sub-filaments adhered to each other is extruded, said two sub-filaments being extruded according to a side-by-side configuration, so that a contact surface is formed between said two sub-filaments that is substantially curved or wave shaped in the cross section of the filament, said two sub-filaments being preferably made of materials having different melting temperature and/or different viscosity, said temperature difference being preferably of at least 10° C. and/or said viscosity difference being preferably higher than 20% when measured by the same method in the same conditions.

10. A nonwoven fabric according to claim 9, wherein said filaments are bicomponent filaments and wherein the contact surface between the two sub-filaments has, as seen in the cross section of the filament, a curved shape with at least one inflection point in said curve.

* * * * *